UNITED STATES PATENT OFFICE.

OLOF CARLSSON AND EDVIN THALL, OF STOCKHOLM, SWEDEN, ASSIGNORS TO ATLAS POWDER COMPANY, OF WILMINGTON, DELAWARE, A CORPORATION OF DELAWARE.

PROCESS OF REDUCING THE VISCOSITY OF VISCOUS SOLUTIONS OF NITROCELLULOSE AND OTHER ESTERS.

1,375,208.

Specification of Letters Patent. Patented Apr. 19, 1921.

No Drawing. Application filed December 4, 1919. Serial No. 342,519.

*To all whom it may concern:*

Be it known that we, OLOF CARLSSON and EDVIN THALL, both citizens of the Kingdom of Sweden, and both residents of Stockholm, Sweden, have invented a new and useful Process of Reducing the Viscosity of Viscous Solutions of Nitrocellulose and other Esters, of which the following is a specification.

When dissolving nitro-cellulose, celluloid, acetyl-cellulose and other esters of cellulose in their solvents, as for instance ether-alcohol, amyl-acetate, ethyl-acetate, acetons and the like, very viscous solutions are obtained which, even in case of a small percentage of dissolved substance, are so thick that they are incapable of flowing.

Attempts have been made to prevent said inconvenience by preparing the cellulose in different manners before the nitration or other chemical treatment. Said methods comprise heating of the cellulose in inert gases, heating the same in an alkaline solution and nitration of the cellulose at high temperature. The heating in inert gases is expensive and difficult to perform from a mechanical point of view, the cellulose frequently being liable to be burnt. On nitrating cellulose prepared in this manner a considerable percentage thereof will always be lost. The heating with alkali is expensive owing to the great consumption of alkali, part of the cellulose, besides, always dissolving in the alkali-hydrate and thus being lost. Moreover, when nitrating such cellulose, a poor output is obtained. Finally, concerning the nitration at high temperature, it is true that a considerable reduction of the viscosity of the dissolved substance may be obtained, but if the nitration be performed at a temperature above 50° C., the apparatus will hardly resist the acids, a great quantity of the cellulose, besides, dissolving in the hot nitrating acid and being lost.

All of said methods, even if combined and carried to the utmost limit, do not, however, afford for certain technical purposes any satisfactory result in respect of reduced viscosity.

The object of our present process is to provide means whereby it will be possible to reduce the viscosity of solutions of nitro-cellulose, celluloid, acetyl-cellulose and other cellulose-esters in their solvents without any previous preparation of the cellulose used as starting material in order to reduce the viscosity. By this process for instance easily flowing solutions of celluloid in amyl-acetate may be obtained, such solutions otherwise being very viscous.

We have discovered that solutions of nitro-cellulose and cellulose-esters in their solvents change their viscosity permanently, when heated.

The heating may be performed at temperatures within rather wide ranges, generally between a temperature of 60° C. and the temperature at which the esters in question are decomposed. The time of heating will vary with the temperature used and is also dependent on the nature of the material treated and the substance used as solvent for said materials.

The invention may be carried out for instance in the following manner:

A slowly flowing, very viscous solution of nitro-cellulose, celluloid, acetyl-cellulose or other esters of cellulose is confined in an autoclave, in order to prevent the escape of the solvent, and then subjected to heating. The heating temperature has a certain relation to the duration of the heating: The longer and the more intensively the heating is effected, the more the viscosity is reduced. Thus a solution of nitro-cellulose in amyl-acetate having the consistency of soft soap will, when heated for an hour to 120° C., be converted into an easily flowing solution having the consistency of water. The solutions treated in this manner do not undergo any change as to their properties excepting the viscosity.

By this process an economical reduction of the viscosity of the aforementioned solutions is obtained the product flowing so easily that it may be filtered through a common filter and thus liberated from all mechanical impurities, a result of great importance in most of technical proceedings using such solutions.

Having now particularly described and ascertained the nature of our said invention and in what manner the same is to be performed, we declare that what we claim is:—

1. Process of reducing permanently the viscosity of solutions of cellulose esters, consisting in heating the solutions to a temperature between 60° C. and the temperature at which the compound in question is decomposed.

2. Process of reducing permanently the viscosity of solutions of cellulose esters, consisting in heating the solutions in a closed vessel to a temperature between 60° C. and the temperature at which the compound in question is decomposed.

3. A process for making highly concentrated solutions of nitrocellulose having sufficient fluidity to be used as a lacquer or spray, which consists in treating a mixture of nitro-cotton and solvent with heat and pressure.

4. A process for making highly concentrated solutions of nitrocellulose having sufficient fluidity to be used as a lacquer or spray, which consists in treating a mixture of nitro-cotton and solvent simultaneously with heat and pressure.

In testimony whereof we have signed our names.

OLOF CARLSSON.
EDVIN THALL.